United States Patent Office 2,794,809
Patented June 4, 1957

2,794,809
NITRATE COMPOUNDS AND PROCESS FOR PRODUCING SAME

Harvey D. Troutman, Royal Oak, Mich., assignor to Parke, Davis & Company, Detroit, Mich., a corporation of Michigan No Drawing. Application March 7, 1956,
Serial No. 569,965

9 Claims. (Cl. 260—326)

This invention relates to substituted benzyl nitrate compounds and a process for producing the same. More particularly, the invention relates to α-imidomethyl-p-nitrobenzyl nitrate compounds having the formula,

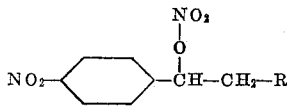

where R is a cyclic imide residue such as phthalimido, succinimido, maleimido, substituted succinimido or a similar cyclic imido group.

The products produced by the process of the invention are useful for the production of α-imido-p-nitroacetophenones, being convertible thereto by reaction with at least one equivalent of a basic substance such as an alkali metal hydroxide. The α-imido-p-nitroacetophenones in turn are of particular use for the production of α-amino-p-nitroacetophenone to which they can easily be converted by known hydrolytic means. α-Amino-p-nitroacetophenone is a very important industrial chemical. The largest use of α-amino-p-nitroacetophenone at the present time is as an intermediate in the production of chloramphenicol. Unfortunately, α-amino-p-nitroacetophenone is quite expensive because so many chemical transformations are necessary to produce it from readily available materials. The best process for producing this material and the one which is now used commercially involves nitrating ethyl benzene to obtain p-nitroethylbenzene, oxidizing the p-nitroethylbenzene so obtained to p-nitroacetophenone, brominating the p-nitroacetophenone to obtain α-bromo-p-nitroacetophenone, reacting the α-bromo-p-nitroacetophenone with hexamethylene tetramine, and finally hydrolyzing the α-bromo-p-nitroacetophenonehexamethylene tetramine complex. From an industrial standpoint it is always important to eliminate as many chemical transformations as possible since this not only decreases the labor costs of the over-all process, but releases plant equipment for further production or the production of other products.

It is an object of the present invention to provide new and useful starting materials for the production of α-amino-p-nitroacetophenone and α-imido-p-nitroacetophenones.

It is also an object to provide a process for producing α-imidomethyl-p-nitrobenzyl nitrate compounds by a simple process from readily obtainable and cheap starting materials.

In accordance with the invention these objects and further objects which will become apparent hereinafter are realized by reacting an α-imidomethyl benzyl alcohol with at least two equivalents of nitric acid to produce the corresponding α-imidomethyl - p - nitrobenzyl nitrate. The process can be represented as follows:

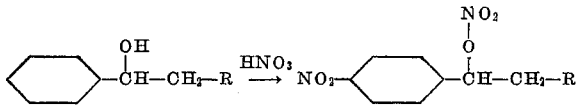

where R has the same significance as set forth above. The α-imidomethyl benzyl alcohols used as starting materials can be produced readily from the corresponding imide and styrene oxide by the method described in German Patent No. 810,028. Thus, the over-all process for producing α-amino-p-nitroacetophenone comprising the present process involves four steps or transformations rather than five as required by the currently accepted commercial method.

In carrying out the process of the invention one reacts the α-imidomethyl benzyl alcohol with fuming nitric acid or 100% nitric acid, that is, nitric acid having a specific gravity of at least 1.4, at a temperature between 0 and —40° C. The amount of nitric acid employed can be varied considerably but at least two equivalents must be used to introduce the nitro group in the phenyl ring of the benzyl alcohol and to esterify the free hydroxyl group. The reaction proceeds rapidly and is usually complete as soon as, or shortly after, the reactants have been mixed. The α-imidomethyl-p-nitrobenzyl nitrate is isolated from the reaction mixture simply by diluting the mixture with ice water and collecting the product. The material thus obtained can be purified, if desired, by recrystallization. For the production of α-imido-p-nitroacetophenones it is preferable for reasons of economy to use the product without purification.

The invention is illustrated by the following specific examples.

Example 1

(a) A mixture consisting of 300 g. of styrene oxide and 177 g. of phthalimide is stirred and heated at 155–170° C. for six hours. The mixture is cooled to 50–70° C., 200 ml. of benzene are added and the mixture allowed to stand at room temperature for sixteen hours. The crude α-phthalimidomethyl - benzyl alcohol is collected, washed with 500 ml. of benzene and dried; yield 190 g. If desired, the product can be recrystallized from isopropanol; M. P. 162–164° C.

12.5 g. of α-phthalimidomethyl-benzyl alcohol is added in small portions with stirring to 100 ml. of fuming nitric acid (sp. gr. 1.5) at —25° C. During the addition the temperature is kept at —20 to —30° C. by the addition of Dry Ice. After the addition has been completed the mixture is stirred for one-half hour at —20 and then allowed to warm to 0° C. The reaction mixture is added slowly to 800 ml. of ice and water, the solid collected and washed with water. The solid product is washed with ethanol, then digested with two 500 ml. portions of boiling methanol and finally dried; yield 15.2 g. If desired, the crude α-phthalimidomethyl-p-nitrobenzyl nitrate may be recrystallized from glacial acetic acid, but this is not necessary. The recrystallized material melts at 170–190° C. with decomposition and evolves gas at 190–200° C.

1.8 g. of crude α-phthalimidomethyl-p-nitrobenzyl nitrate is added to 15 ml. of dimethylformamide and 5 ml. of piperidine. The temperature rises to 45–50° C. and the solution turns dark. When the temperature falls to 35° C., the mixture is poured into 200 ml. of ice and water containing 10 ml. of hydrochloric acid (sp. gr. 1.18) and the solid collected. The product is washed with water, dissolved in hot glacial acetic acid and the solution cooled. The crystalline α-phthalimido-p-nitroacetophenone is collected and dried; yield 0.95 g.; 220–230° C. The product when pure melts at 236–237° C. This material can be hydrolyzed to α-amino-p-nitroacetophenone by heating it first with alkali and then with sulfuric acid in the usual manner for hydrolyzing phthalimides.

(b) 3.6 g. of crude α-phthalimidomethyl-p-nitrobenzyl nitrate (prepared as described above) is added to 5 ml. of piperidine and 35 ml. of dioxane. The temperature rises to about 39–40° C. during the addition. The mixture is allowed to cool slightly, and then heated at 50–60° C. for fifteen minutes. The mixture is poured into 400 ml. of water containing 10 ml. of hydrochloric acid (sp. gr. 1.18) and the gummy solid which separates collected. The product is washed with water and recrystallized from glacial acetic acid to obtain 0.75 g. of α-phthalimido-p-nitroacetophenone melting at 230–235° C.

(c) 10.7 g. of crude α-phthalimidomethyl-p-nitrobenzyl nitrate (prepared as described above) is added slowly to 6 g. of potassium carbonate in 200 ml. of methanol at 55–60° C., and the mixture refluxed for one hour. The mixture is cooled, poured into 1500 ml. of water containing 20 ml. of hydrochloric acid (sp. gr. 1.18) and the product collected, washed with water and dried; yield 5.5 g. Recrystallization from glacial acetic acid yields α-phthalimido-p-nitroacetophenon; M. P. 228–235° C.

*Example 2*

A mixture consisting of 99 g. of succinimide, 240 g. of styrene oxide and 360 ml. of dimethylformamide is heated under reflux for sixteen hours and then 300 ml. of the reaction mixture removed by vacuum distillation. The residue is taken up in six liters of chloroform, and the chloroform extract washed with water and then with 1.5 liters of 0.2 N potassium hydroxide solution. The extract is dried and the solution concentrated to a volume of 900 ml. The residue is diluted with 1350 ml. of cyclohexane and the α-succinimidomethyl benzyl alcohol which precipitates is collected; yield 90 g. The product can be purified by recrystallization from benzene; M. P. 155–157° C.

9 g. of α-succinimidomethyl benzyl alcohol is added in small portions with stirring to 90 ml. of fuming nitric acid (sp. gr. 1.5) keeping the temperature at −30° C. The mixture is stirred at −30° C. for one-half hour, then at −10° C. for one-half hour and finally at 0° C. for one-half hour. The mixture is poured into one liter of ice and water, and the white solid which separates is collected, washed well with water and dried; yield 9 g. If desired, the crude α-succinimidomethyl-p-nitrobenzyl nitrate can be purified by recrystallization from 95% ethanol; M. P. 136–139° C.

3.96 g. of crude α-succinimidomethyl-p-nitrobenzyl nitrate and 20 ml. of methanol are added to 2.2 g. of potassium carbonate and 50 ml. of methanol. The mixture is stirred and heated at 45–55° C. for one hour, cooled and poured into 250 ml. of water containing 5 ml. of hydrochloric acid (sp. gr. 1.18). The gummy product which separates is collected, washed with water and recrystallized from absolute ethanol to obtain the desired α-succinimido-p-nitroacetophenone; M. P. 125–145° C.; yield 2.1 g.

By using maleimide in the above procedure instead of succinimide one obtains α-maleimido-p-nitroacetophenone.

This application is a continuation-in-part of my copending application Serial No. 466,239, filed November 1, 1954.

What I claim is:
1. Process for the production of an α-imidomethyl-p-nitrobenzyl nitrate of formula,

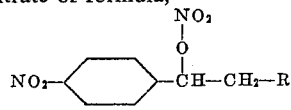

which comprising reacting an α-imidomethyl benzyl alcohol of formula,

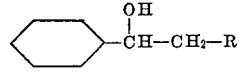

with at least two equivalents of nitric acid, where R is a cyclic imide residue of the class consisting of phthalimido, succinimido and maleimido groups.

2. Process for the production of an α-imidomethyl-p-nitrobenzyl nitrate of formula,

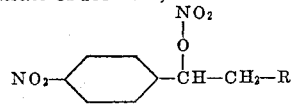

which comprises reacting at a temperature between 0 and −40° C. an α-imidomethyl benzyl alcohol of formula,

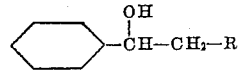

with at least two equivalents of nitric acid having a specific gravity of at least 1.4, where R is a cyclic imido group of the class consisting of phthalimido, succinimido and maleimido groups.

3. Process for the production of α-phthalimido-methyl-p-nitrobenzyl nitrate which comprises reacting α-phthalimidomethyl benzyl alcohol with at least two equivalents of nitric acid having a specific gravity of at least 1.4 at a temperature between 0 and −40° C.

4. Process for the production of α-succinimido-methyl-p-nitrobenzyl nitrate which comprises reacting α-succinimido-methyl benzyl alcohol with at least two equivalents of nitric acid having a specific gravity of at least 1.4 at a temperature between 0 and −40° C.

5. Process for the production of α-maleimidomethyl-p-nitrobenzyl nitrate which comprises reacting α-maleimidomethyl benzyl alcohol with at least two equivalents of nitric acid having a specific gravity of at least 1.4 at a temperature between 0 and −40° C.

6. α-Imidomethyl-p-nitrobenzyl nitrate compounds having the formula,

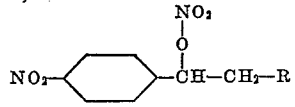

where R is a member selected from the class consisting of phthalimido, succinimido and maleimido groups.

7. α-Phthalimidomethyl-p-nitrobenzyl nitrate.
8. α-Succinimidomethyl-p-nitrobenzyl nitrate.
9. α-Maleimidomethyl-p-nitrobenzyl nitrate.

No references cited.